(12) United States Patent
Schafer

(10) Patent No.: US 11,364,532 B2
(45) Date of Patent: Jun. 21, 2022

(54) CRIMPING TOOL

(71) Applicant: Oetiker Tool Corporation, Branford, CT (US)

(72) Inventor: Joshua Schafer, Meriden, CT (US)

(73) Assignee: OETIKER TOOL CORPORATION, Branford, CT (US)

( * ) Notice: Subject to any disclaimer, the term of this patent is extended or adjusted under 35 U.S.C. 154(b) by 0 days.

(21) Appl. No.: 16/979,720

(22) PCT Filed: Mar. 13, 2019

(86) PCT No.: PCT/US2019/022022
§ 371 (c)(1),
(2) Date: Sep. 10, 2020

(87) PCT Pub. No.: WO2019/178209
PCT Pub. Date: Sep. 19, 2019

(65) Prior Publication Data
US 2021/0039155 A1    Feb. 11, 2021

Related U.S. Application Data

(60) Provisional application No. 62/643,254, filed on Mar. 15, 2018.

(51) Int. Cl.
*B25B 7/22* (2006.01)
*B25B 17/00* (2006.01)
(Continued)

(52) U.S. Cl.
CPC ............ *B21D 39/048* (2013.01); *B23P 11/00* (2013.01); *B23P 11/005* (2013.01); *B23P 13/00* (2013.01);
(Continued)

(58) Field of Classification Search
CPC ......... B23P 11/00; B23P 11/005; B23P 13/00; B21D 39/048; B25B 7/22; B25B 17/00;
(Continued)

(56) References Cited

U.S. PATENT DOCUMENTS 2,808,748 A    10/1957    Bledsoe
4,660,241 A *  4/1987    Chen ..................... B25B 7/04
                                              29/566.4
(Continued)

FOREIGN PATENT DOCUMENTS

CN    1049306 A    2/1991
CN    2282282 Y    5/1998
(Continued)

OTHER PUBLICATIONS

Indian Office Action for Application No. 202017039088 dated Jan. 15, 2021; 4 pgs.
(Continued)

*Primary Examiner* — Sarang Afzali
*Assistant Examiner* — Darrell C Ford
(74) *Attorney, Agent, or Firm* — Cantor Colburn LLP

(57) ABSTRACT

A crimping tool is provided. The crimping tool includes a stationary jaw and a movable jaw. The movable jaw is arranged adjacent the stationary jaw, the movable jaw being movable from an open position to a closed position. A linkage is operably coupled to the movable jaw on one end, the linkage rotatable about an axle. A first input member is operably coupled to the linkage to rotate the linkage about the axle, the first input member rotating about a first axis. A second input member is operably coupled to the linkage to rotate the linkage about the axle, the second input member rotating about a second axis, the second axis being substantially perpendicular to the first axis.

7 Claims, 14 Drawing Sheets

(51) Int. Cl.
  *B25B 7/00* (2006.01)
  *B21D 39/04* (2006.01)
  B23P 11/00 (2006.01)
  B23P 13/00 (2006.01)
(52) U.S. Cl.
  CPC . *B25B 7/00* (2013.01); *B25B 7/22* (2013.01);
     *B25B 17/00* (2013.01); *Y10T 29/53909*
     (2015.01); *Y10T 29/53952* (2015.01); *Y10T*
     *29/53996* (2015.01)
(58) Field of Classification Search
  CPC ......... B25B 7/00; B25B 27/10; B25B 27/146;
     Y10T 29/53909; Y10T 29/53952; Y10T
     29/53996; Y10T 29/53235; Y10T
     29/53709; Y10T 29/53377; Y10T
     29/53774; Y10T 29/53778; Y10T
     29/53783; B25G 1/063; H01R 43/042
  USPC ... 29/243.5, 243.53, 243.55, 243.56, 243.54,
     29/753, 270, 280, 283.5
  See application file for complete search history.

(56) References Cited

U.S. PATENT DOCUMENTS

| | | | |
|---|---|---|---|
| 4,747,588 A | 5/1988 | Dillhoff | |
| 4,757,588 A | 7/1988 | Churchich | |
| 5,259,276 A | 11/1993 | Baron | |
| 5,280,716 A * | 1/1994 | Ryan | B25B 7/123 29/751 |
| 5,870,925 A * | 2/1999 | Morris | H01R 43/042 72/409.12 |
| 6,138,346 A * | 10/2000 | Shutts | B25B 7/126 29/741 |
| 6,164,107 A * | 12/2000 | Korba, Jr. | B21D 7/063 72/31.1 |
| 6,220,126 B1 | 4/2001 | Domenge | |
| 7,454,999 B2 * | 11/2008 | Wu | B25B 7/123 81/367 |
| 9,216,494 B2 * | 12/2015 | Lai | B25B 7/123 |
| 2003/0230132 A1 * | 12/2003 | Bowles | B25B 27/10 72/416 |
| 2006/0213248 A1 | 9/2006 | Cleland et al. | |
| 2007/0209484 A1 | 9/2007 | Chervenak et al. | |
| 2009/0120245 A1 * | 5/2009 | Zhang | B25B 7/12 81/60 |
| 2009/0254326 A1 | 10/2009 | Isaacs | |
| 2011/0252633 A1 * | 10/2011 | Dierks | G02B 6/3807 29/705 |
| 2014/0066994 A1 | 3/2014 | Dominik et al. | |
| 2014/0331825 A1 | 11/2014 | Khristyuchenko et al. | |
| 2015/0072572 A1 * | 3/2015 | Easterling | B25B 7/22 439/863 |
| 2015/0298192 A1 | 10/2015 | Paris et al. | |
| 2017/0239788 A1 * | 8/2017 | Battenfeld | B25B 27/10 |
| 2021/0336400 A1 * | 10/2021 | Glockseisen | H01R 43/058 |
| 2021/0339367 A1 * | 11/2021 | Frenken | B25B 27/10 |
| 2021/0408749 A1 * | 12/2021 | Keller | H01R 43/042 |

FOREIGN PATENT DOCUMENTS

| | | |
|---|---|---|
| CN | 101036979 A | 9/2007 |
| CN | 103384584 A | 11/2013 |
| CN | 204367412 U | 6/2015 |
| DE | 3719442 A1 | 12/1988 |
| DE | 4139260 A1 | 6/1993 |
| DE | 29806179 U1 | 10/1998 |
| EP | 0838309 A1 | 4/1998 |
| GB | 115120 A | 8/1934 |
| GB | 415120 A * | 8/1934 |
| JP | 2000068024 A | 3/2000 |
| WO | 2008037189 A1 | 4/2008 |

OTHER PUBLICATIONS

Chinese Office Action for Application No. 201980015584.0 dated Apr. 6, 2021; 6 pgs.
International Search Report and Written Opinion for International Application No. PCT/US19/22022 dated May 29, 2019, 11 pgs.
Chinese Office Action for Application No. 201980015584.0 dated Jan. 30, 2022.
Extended European Search Report for Application No. 19768390.7 dated Feb. 11, 2022; 13 pgs.

* cited by examiner

CRIMPING TOOL

BACKGROUND

The subject matter disclosed herein relates to a hand tool, and in particular to a hand tool for crimping clamps such as those used in connecting fittings to tubing.

One type of clamp is a stainless steel band clamp that is formed in a shape of a ring. These band clamps may be used in a variety of applications, such as but not limited to automotive and irrigation systems for example. The ring is slid over and surrounds the tubing and fitting. A tool is then used to crimp the clamp onto the tube. The process of crimping the band reduces the diameter of the band to secure the tubing and also deforms the band material to reduce the risk of the clamp loosening over time. It should be appreciated that considerable force is used to crimp the band. Typical tools perform the crimp with a single actuation of the tool. In many instances this causes the tool to have longer than desired handles in order to obtain a desired mechanical advantage. Further, the handles are usually positioned on the rearward side of the tool which may be awkward to actuate when there are obstructions in the area the operator is working.

Accordingly, while existing crimping tools are suitable for their intended purposes, the need for improvement remains, particularly in providing a crimping tool that includes the features and advantages described herein.

BRIEF DESCRIPTION

According to one aspect of the disclosure a crimping tool is provided. The crimping tool includes a stationary jaw and a movable jaw. The movable jaw is arranged adjacent the stationary jaw, the movable jaw being movable from an open position to a closed position. A linkage is operably coupled to the movable jaw on one end, the linkage rotatable about an axle. A first input member is operably coupled to the linkage to rotate the linkage about the axle, the first input member rotating about a first axis. A second input member is operably coupled to the linkage to rotate the linkage about the axle, the second input member rotating about a second axis, the second axis being substantially perpendicular to the first axis.

In this or one or more other embodiments, the linkage is integral with the movable jaw. In this or one or more other embodiments, the linkage first comprises a first plurality of gear teeth arranged to engage with the first input member and a second plurality of gear teeth arranged to engage with the second input member. In this or one or more other embodiments, a transfer gear coupled between the first input member and the first plurality of gear teeth.

In this or one or more other embodiments, a first frame and a second frame disposed on opposing sides of the linkage, the axle being coupled to the first frame and second frame. Further a handle is movably coupled to the first frame.

In this or one or more other embodiments, the handle is movable between a plurality of positions. In this or one or more other embodiments, the handle includes: a bracket coupled to the first side; a handle portion rotationally coupled to the bracket, the handle having a plurality of first teeth on one end; a position member having a plurality of second teeth arranged to engage the plurality of first teeth; and a biasing member disposed between the bracket and the handle portion to bias the plurality of first teeth into engagement with the plurality of second teeth.

In this or one or more other embodiments, an extension spring coupled to the movable jaw and the stationary jaw, the extension spring being positioned between the axle and a first jaw portion of the movable jaw and a second jaw portion of the stationary jaw. In this or one or more other embodiments, the first jaw portion and the second jaw portion each include a recess, the recesses cooperating to device an opening in the crimped position sized to device a predetermined amount of crimp in a band clamp. In this or one or more other embodiments, the open is offset from a centerline of the movable jaw and stationary jaw. In this or one or more other embodiments, a compression spring coupled between the stationary jaw and the linkage and arranged to bias the movable jaw into the crimped position.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments disclosed herein provide for a crimping tool for band clamps, such as those used with PEX tubing. Embodiments of the crimping tool provide advantages in a compact tool for crimping band clamps. Embodiments of the crimping tool further provide advantages in allowing the actuation of the tool from different directions. Still further embodiments provide advantages in allowing a multi-position handle to be positioned by an operator to facilitate holding of the tool.

Figure 1:
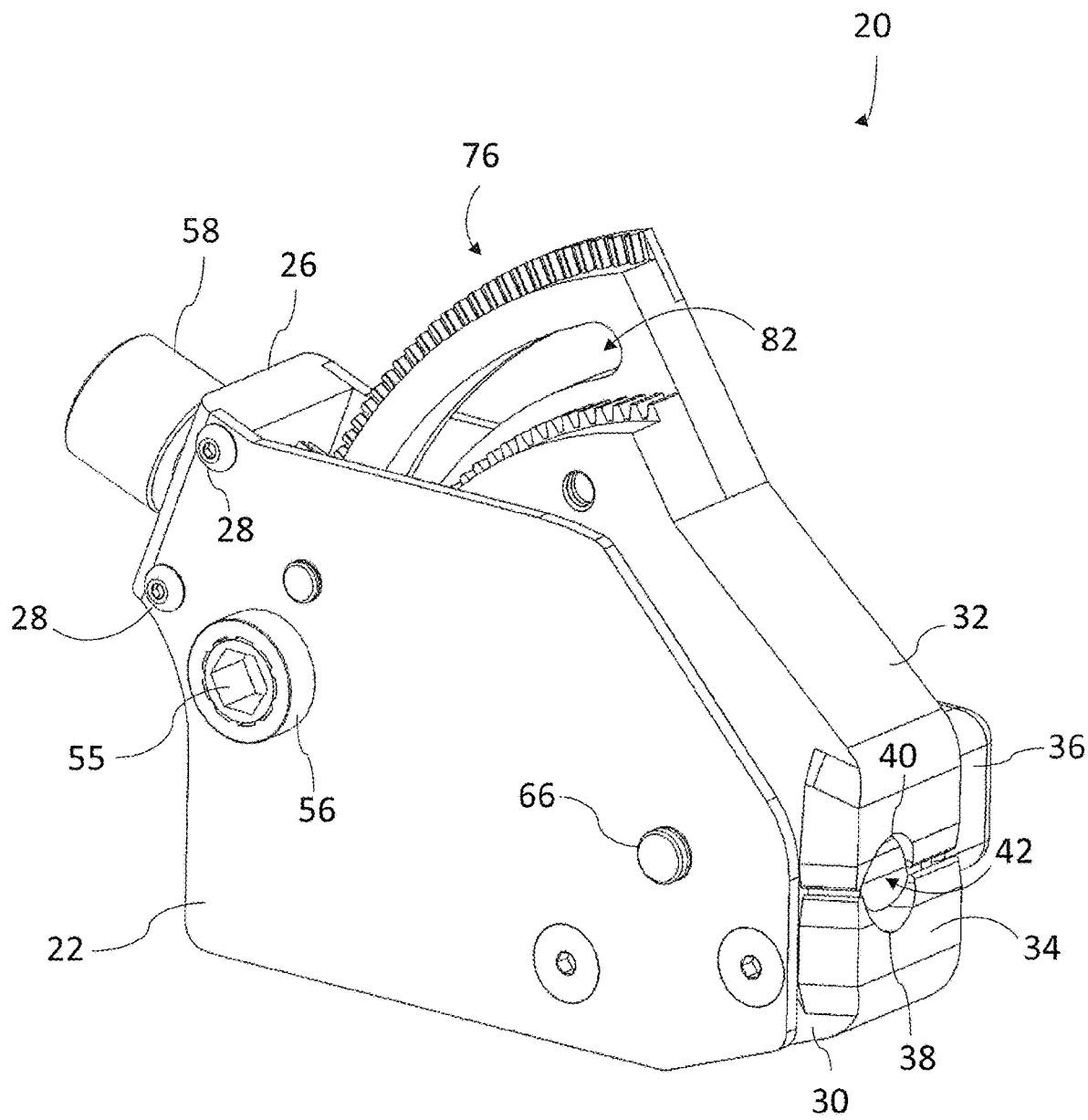
FIG. 1 is a perspective view of a crimping tool in a closed or crimped position in accordance with an embodiment.
Figure 2:
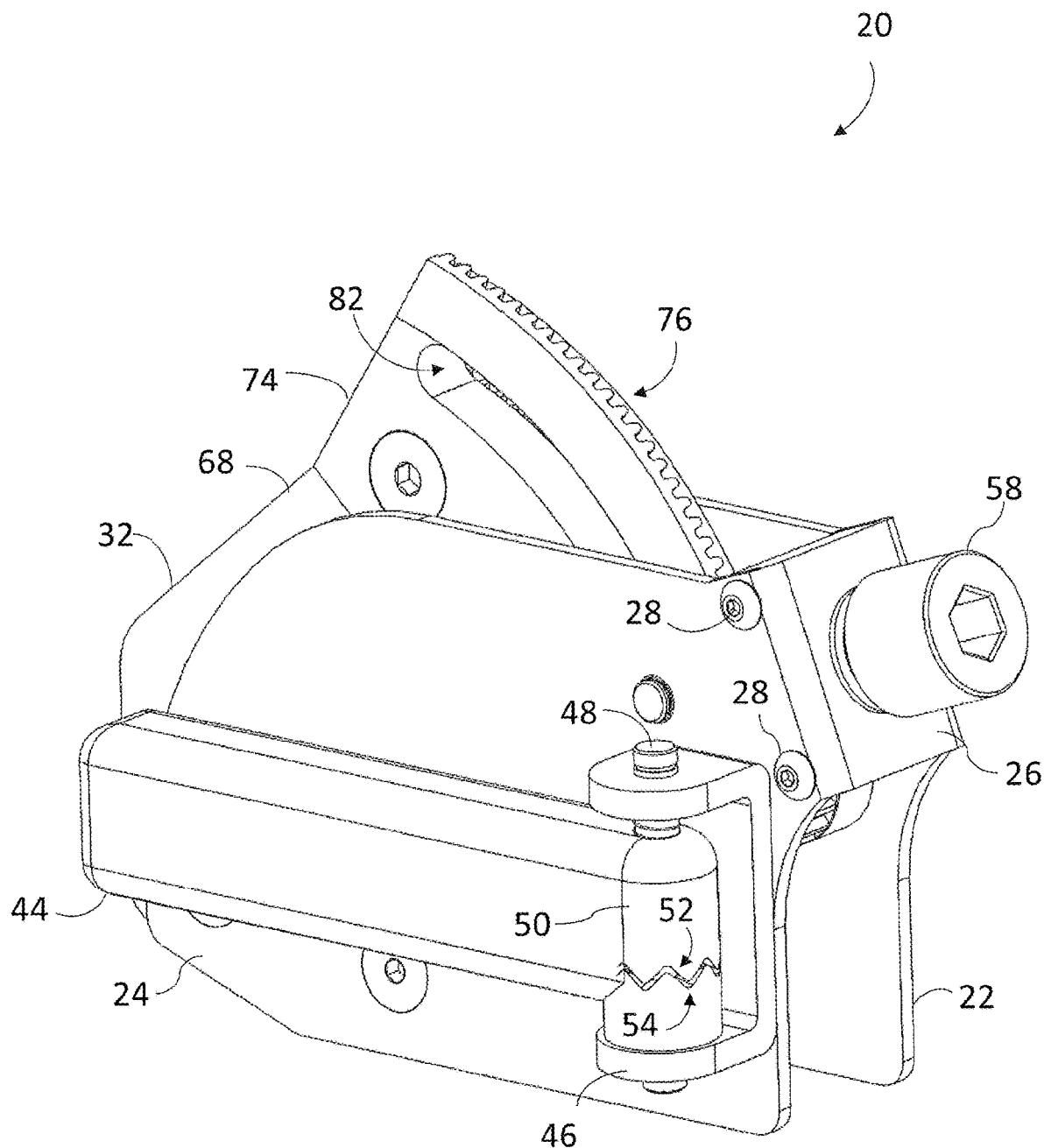
FIG. 2 is a perspective view of a crimping tool in a closed or crimped position in accordance with an embodiment.
Figure 3:
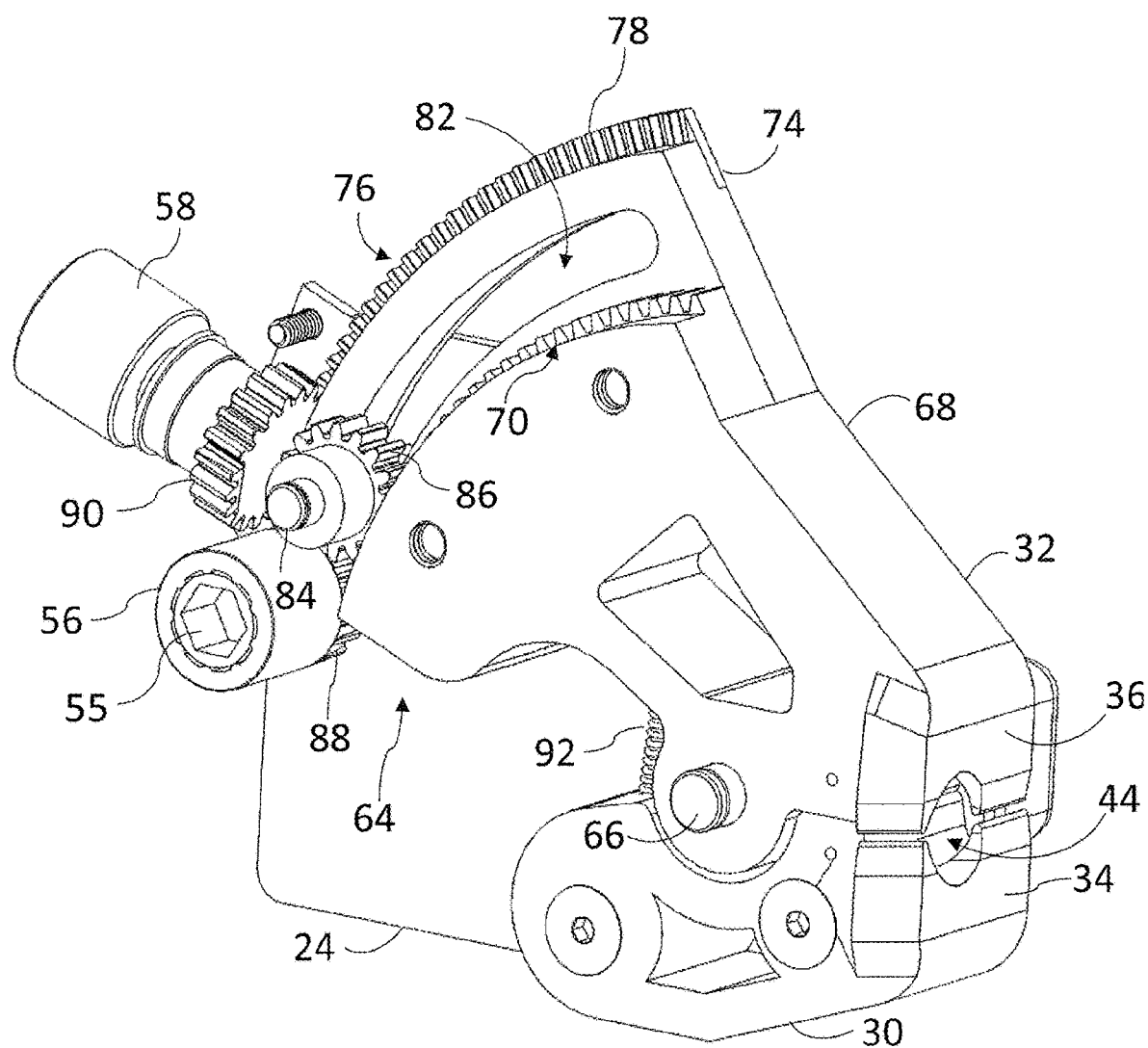
FIG. 3 is a right perspective view of the crimping tool of FIG. 1 with a side plate removed.
Figure 8:
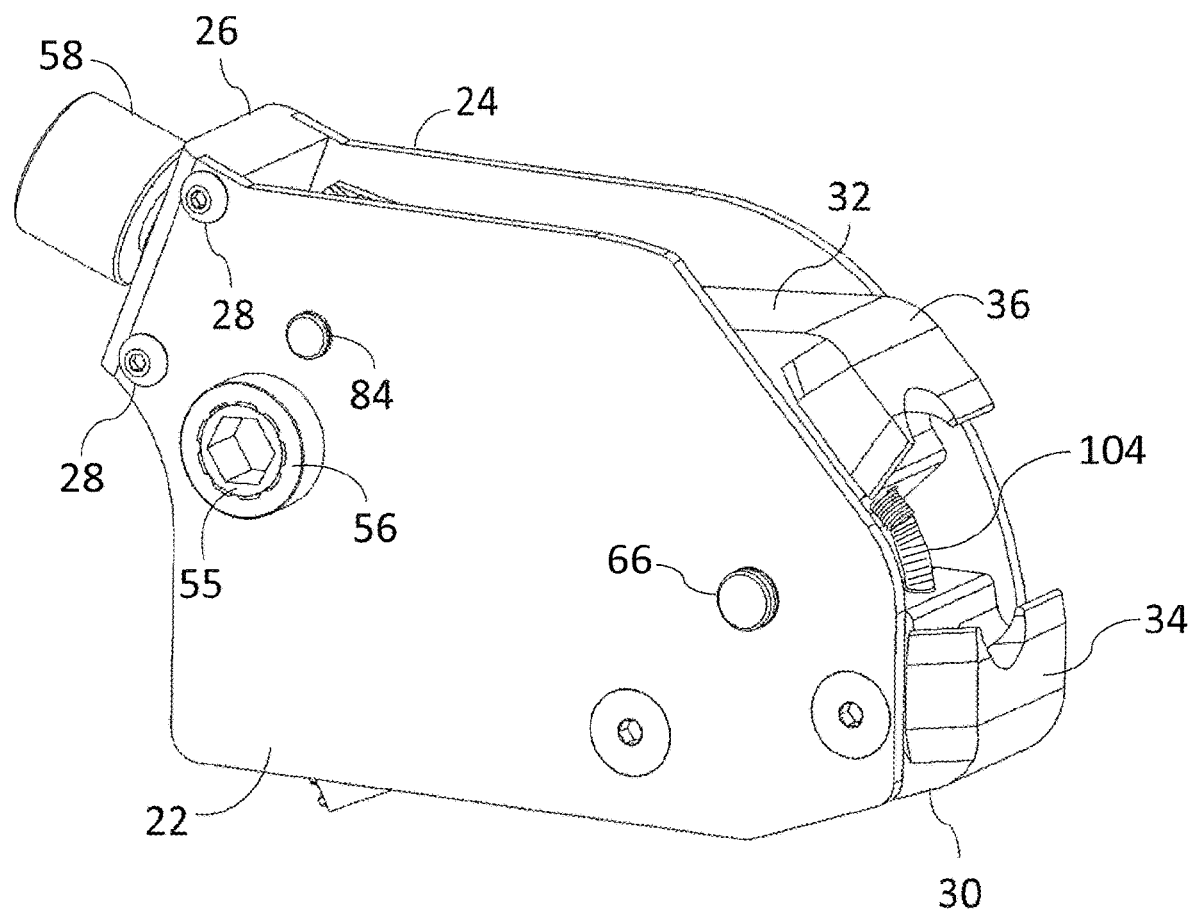
FIG. 8 is a perspective view of the crimping tool of FIG. 1 in an open position.
Figure 9:
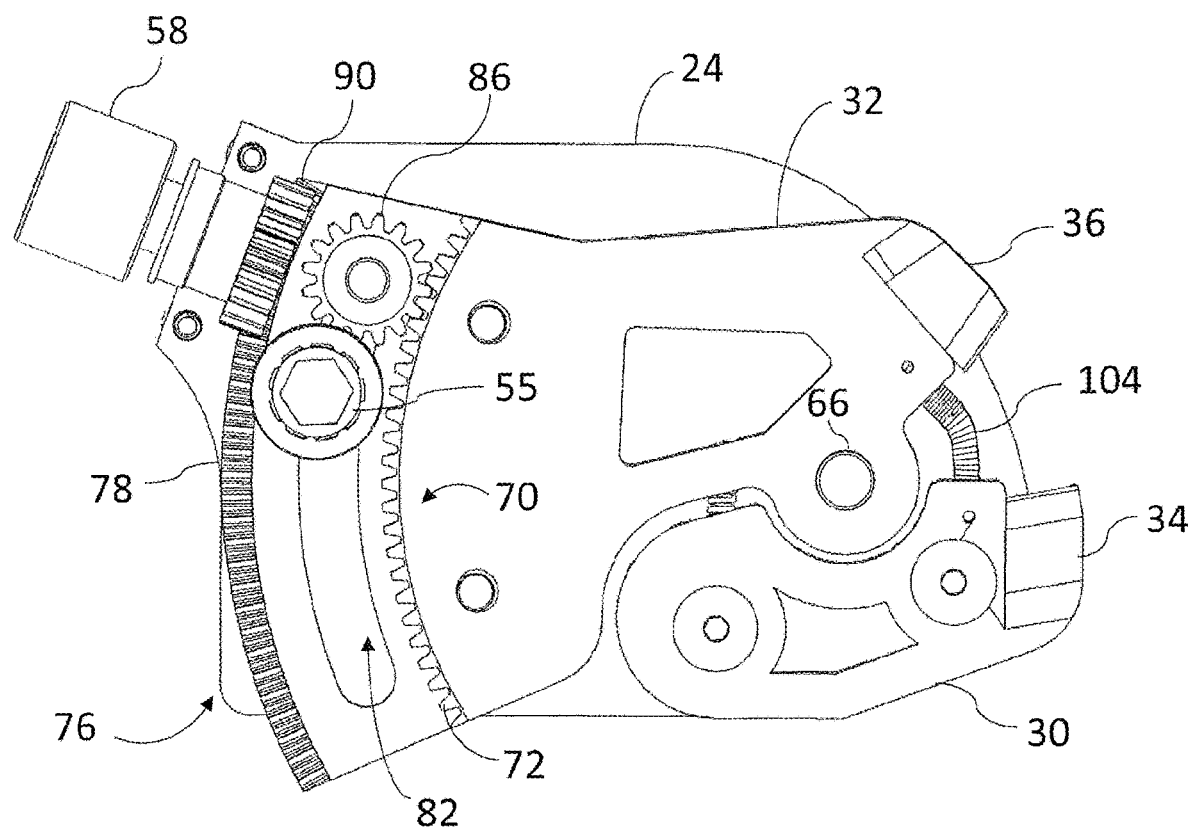
FIG. 9 is a side view of the crimping tool of FIG. 8 with a side plate removed.

Referring now to FIG. 1 and FIG. 2, a crimping tool 20 is shown having a first side plate 22 and a second side plate 24 coupled together, at least partially by an intermediate frame 26. In the exemplary embodiment, a plurality of fasteners, such as fasteners 28 couple the plates 22, 24 and the frame 26. The crimping tool 20 includes a stationary jaw 30 and a movable jaw 32. The stationary jaw 30 remains fixed relative to the side plates 22, 24, while the movable jaw 32 is movable between a closed position (FIG. 1) and an open position (FIG. 8). Each of the jaws 30, 32 have a jaw portion 34, 36 respectively. The jaw portions 34, 36 have recesses 38, 40 that define an opening 42. As will be discussed in more detail herein, the opening 42 is sized to crimp a band clamp a predetermined amount when the movable jaw 32 is in the closed position.

A handle 44 is coupled to side plate 22. As will be discussed in more detail herein, the handle 44 is movable between a plurality of positions to allow the operator to grip the tool 20 in a variety of ways based on the application where it is being used. In an embodiment, the handle 44 is rotatably coupled to a bracket 46 by a pin 48. An end 50 of the handle 44 has a position selector, such as teeth 52, which cooperate with a corresponding position selector, such as teeth 54, that is coupled to the bracket 46.

Figure 4:
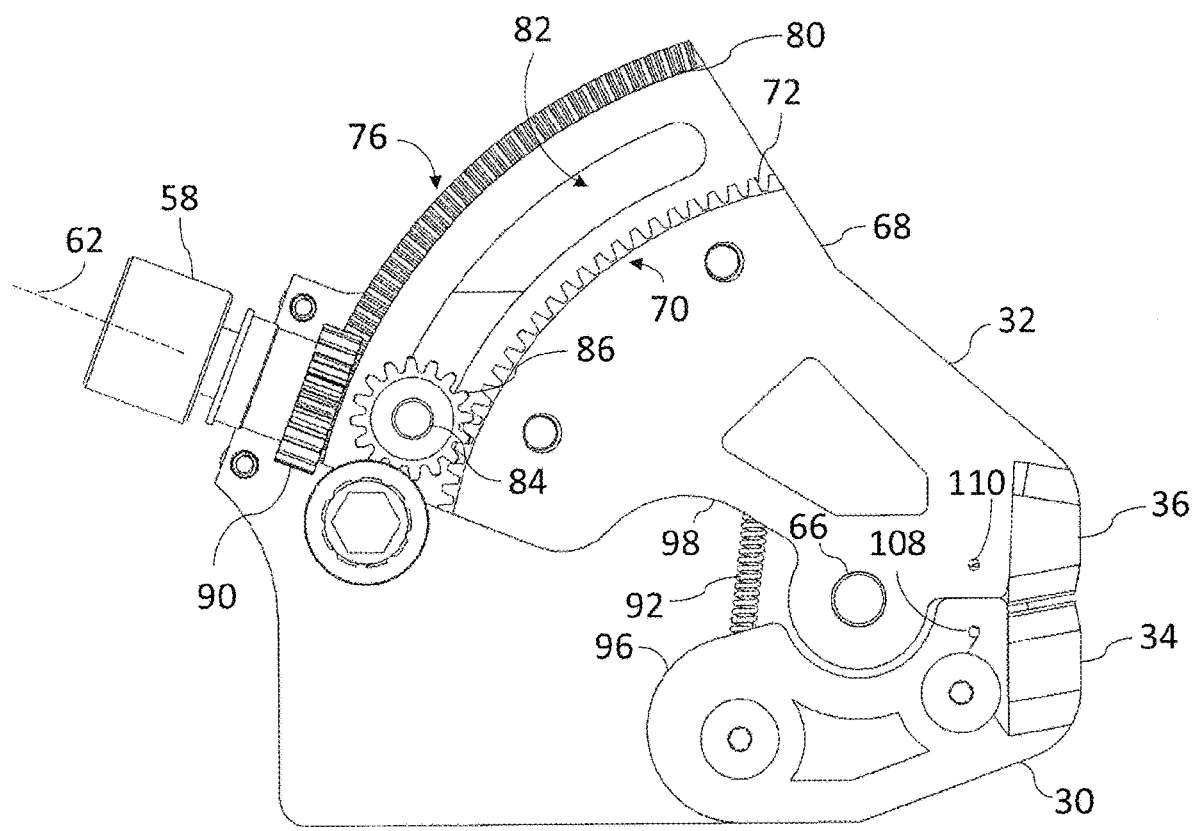
FIG. 4 is a side view of the crimping tool of FIG. 1 with a side plate removed.
Figure 5:
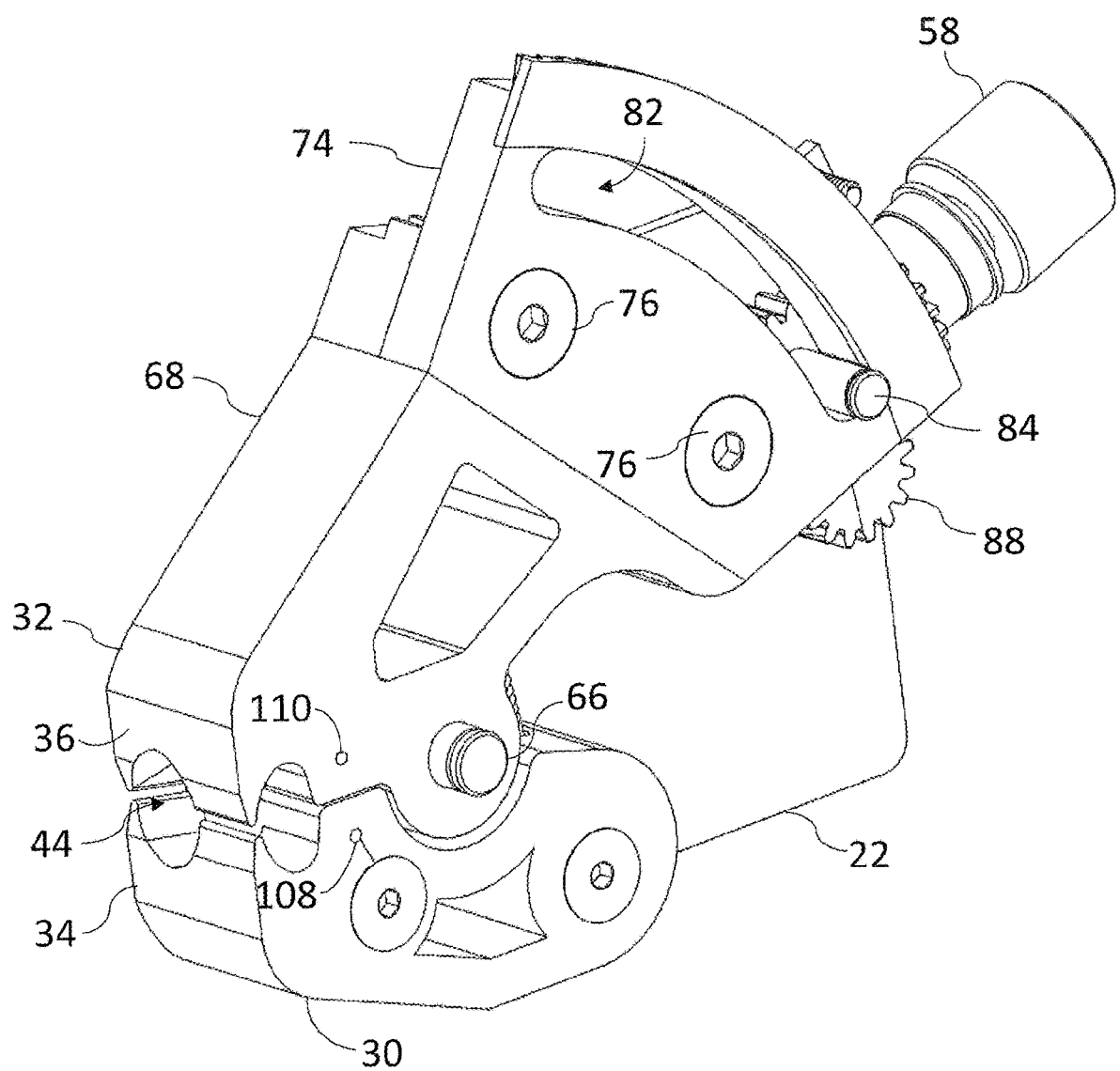
FIG. 5 is a left perspective view of the crimping tool of FIG. 2 with a side plate removed.
Figure 6:
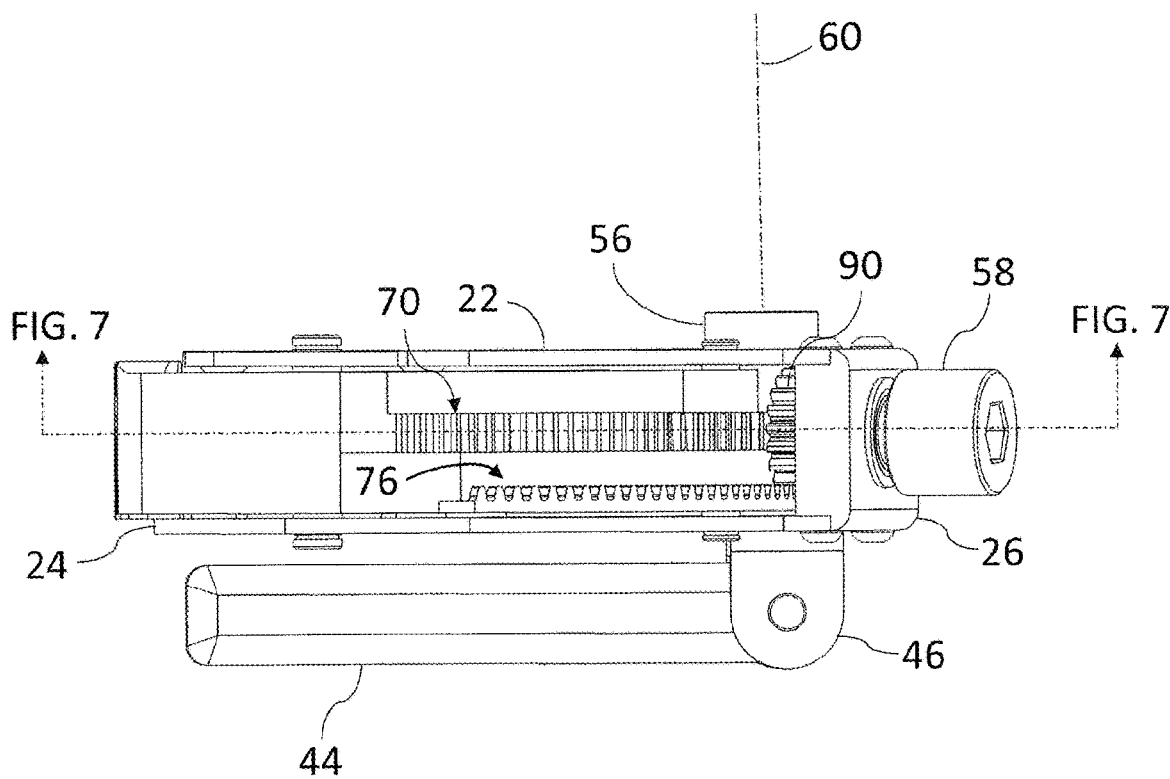
FIG. 6 is a top view of the crimping tool of FIG. 1.
Figure 7:
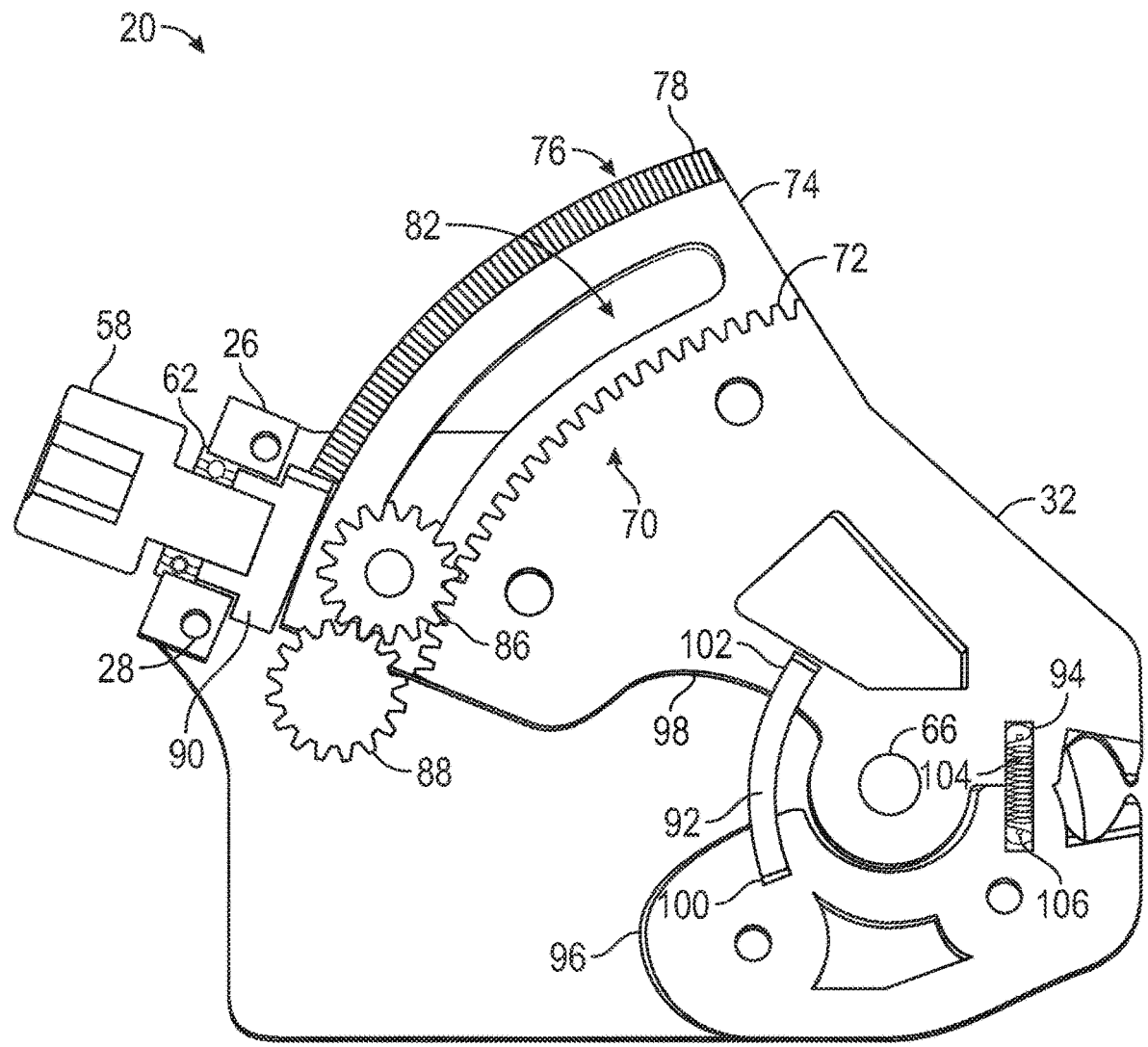
FIG. 7 is a side sectional view of the crimping tool of FIG. 1.

To actuate the tool 20, a first input member 55 and a second input member 58 are provided. The input member 55, 58 are configured to accept a hand tool (not shown), such as an Allen key or a hex-wrench for example. In response to the rotation of the input members 55, 58, the movable jaw 32 may be selectively moved between the open position and the closed position. The first input member 56 is rotationally coupled to the side plate 22 to rotate about a first axis 60 (FIG. 6). In an embodiment, the second input 58 is rotationally coupled to frame 26 about a second axis 62 (FIG. 4). In an embodiment, the first input member 55 is nestled in a needle bearing 56. In an embodiment, the second input member 58 is coupled to a bearing, such as a ball bearing 62 (FIG. 7). The bearings 56, 62 allow the respective input members 55, 58 to rotate freely when the tool 20 is being actuated by the other input member.

Referring now to FIGS. 3-7, the actuation mechanism 64 of the tool 20 is shown and described. In an embodiment, the movable jaw 32 rotates about a shaft 66. The shaft 66 is fixed to the side plates 22, 24. In this embodiment, the movable jaw 32 includes a linkage portion 68. The linkage portion 68 may be arranged on the opposite side of the shaft 66 from the jaw portion 36. It should be appreciated that while the illustrated embodiment shows the linkage portion 68 as being integral with the movable jaw portion 36, this is for exemplary purposes and the claims should not be so limited. In other embodiments, the linkage portion 68 and movable jaw portion 36 are separate components.

In an embodiment, the linkage portion 68 includes a first gear 70 formed to extend from an end of the linkage portion 68. The first gear 70 includes a plurality of teeth 72 arranged on a curved surface having a center that is co-axial with the shaft 66. In this embodiment, the teeth 72 are perpendicular to the side plates 22, 24. In an embodiment, a jaw insert 74 is coupled to the linkage portion 68 by fasteners 76. In one embodiment, the jaw insert 74 is formed by casting. The jaw insert 74 includes a second gear 76 having a plurality of teeth 78. The teeth 78 extend outwardly from a curved end 80 of the jaw insert 74 and are arranged parallel to the side plates 22, 24. The center of the curved end 80 is co-axial with the shaft 66. In an embodiment, the jaw insert 74 includes an arcuate slot 82 having a center co-axial with the shaft 66.

The slot 82 is sized to allow a shaft 84 to pass therethrough. The shaft 84 is fixed to the side plates 22, 24. The slot 82 is sized to allow the movable jaw 36 to move between the open position and the closed position without interference from the shaft 84. Coupled to rotate on the shaft 84 is a transfer gear 86. The transfer gear 86 is arranged to engage the teeth 72 and a first input gear 88 and transfer torque therebetween. It should be appreciated that the gears 86, 88 cooperate with the teeth 72 to rotate the movable jaw 32 between the open position and closed position. In the illustrated embodiment, the first input gear 88 is integrally formed with the first input member 55.

Coupled to the second input member 58 is a second input gear 90. The second input gear 90 includes a plurality of teeth that a sized and shaped to engage the teeth 78 of second gear 76 and transfer torque from the second input member 58. It should be appreciated that the gears 76, 90 cooperate to rotate the movable jaw 32 between the open position and the closed position.

In the illustrated embodiment, the movable jaw 32 is biased into the closed position. In an embodiment, the biasing of the movable jaw 32 is provided by a compression spring 92 that is arranged between an end 96 of the stationary jaw 30 and a lower surface 98 of the movable jaw 32. In an embodiment, the end 96 has a blind hole 100 sized to receive an end of the compression spring 92 and the surface 98 also has a blind hole 102 sized to receive an opposite end of the compression spring 92. It should be appreciated that the compression spring applies a force on the movable jaw 32 normal to the bottom surface of the pocket 100. The force applied by the compression spring 92 causes the movable jaw 32 to rotate about the shaft 66 into the closed position (clockwise when viewed from the position of FIG. 7).

In the illustrated embodiment, a second biasing member, such as extension spring 94 for example, is positioned on a side of the shaft 66 opposite the compression spring 92. In an embodiment, the extension spring 94 is positioned in a pocket defined by blind hole 104 in the movable jaw 32 and blind hole 106 in the stationary jaw 30. The ends of the extension spring 94 are held in place by pins 108, 110 that are pressed into the stationary jaw 30 and the movable jaw 32 respectively. The extension spring 94 pulls on the movable jaw 32 to rotate the movable jaw 32 about the shaft 66 towards the closed position (clockwise when viewed from the position of FIG. 7).

It should be appreciated that due to the biasing by the springs 92, 94, when the operator moves the movable jaw to the open position (FIG. 8) and releases the input members 55, 58, the movable jaw 32 will rotate to the closed position.

Figure 10:
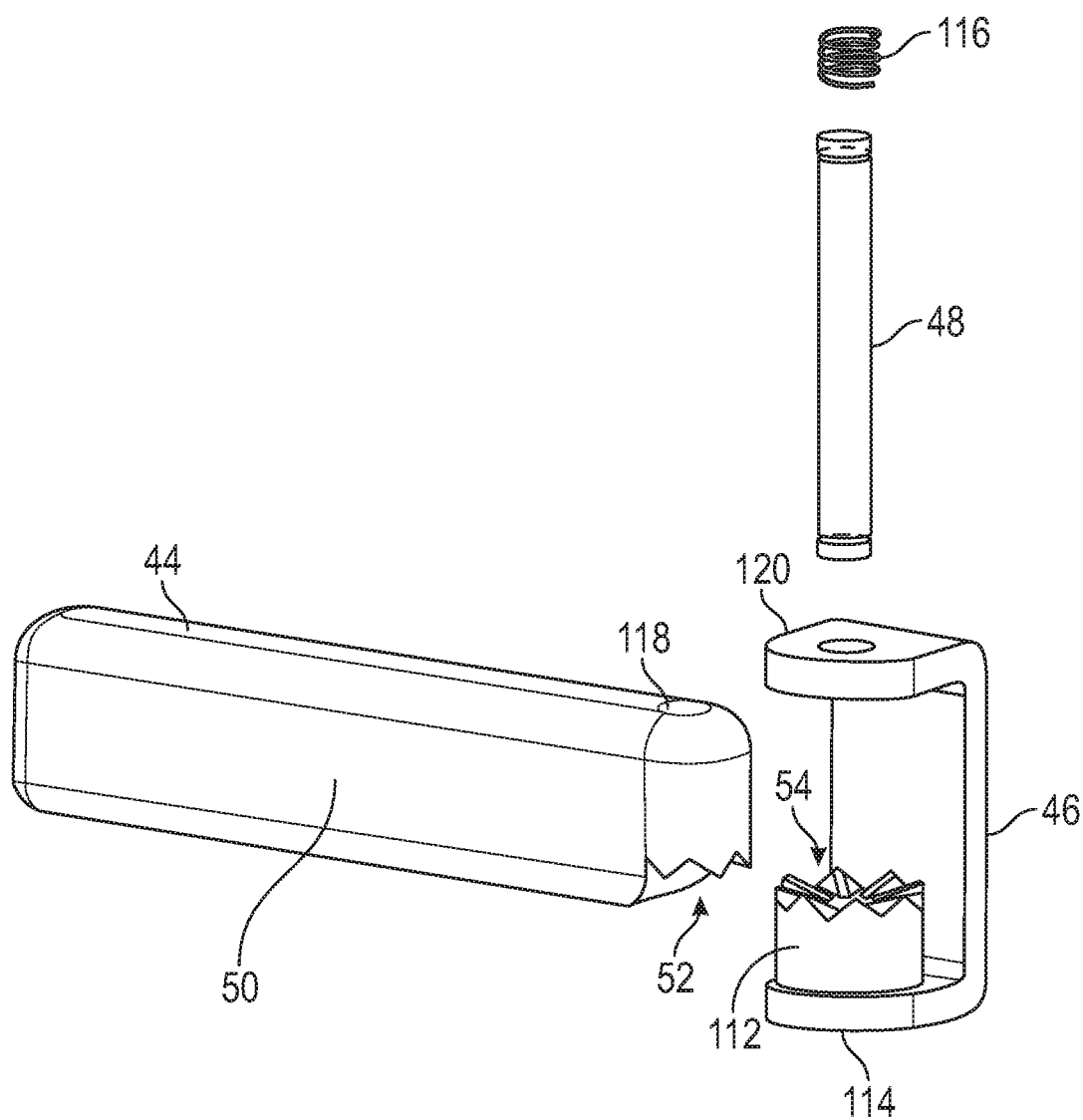
FIG. 10 is a perspective exploded view of a handle assembly for the crimping tool of FIG. 1.
Figure 11:
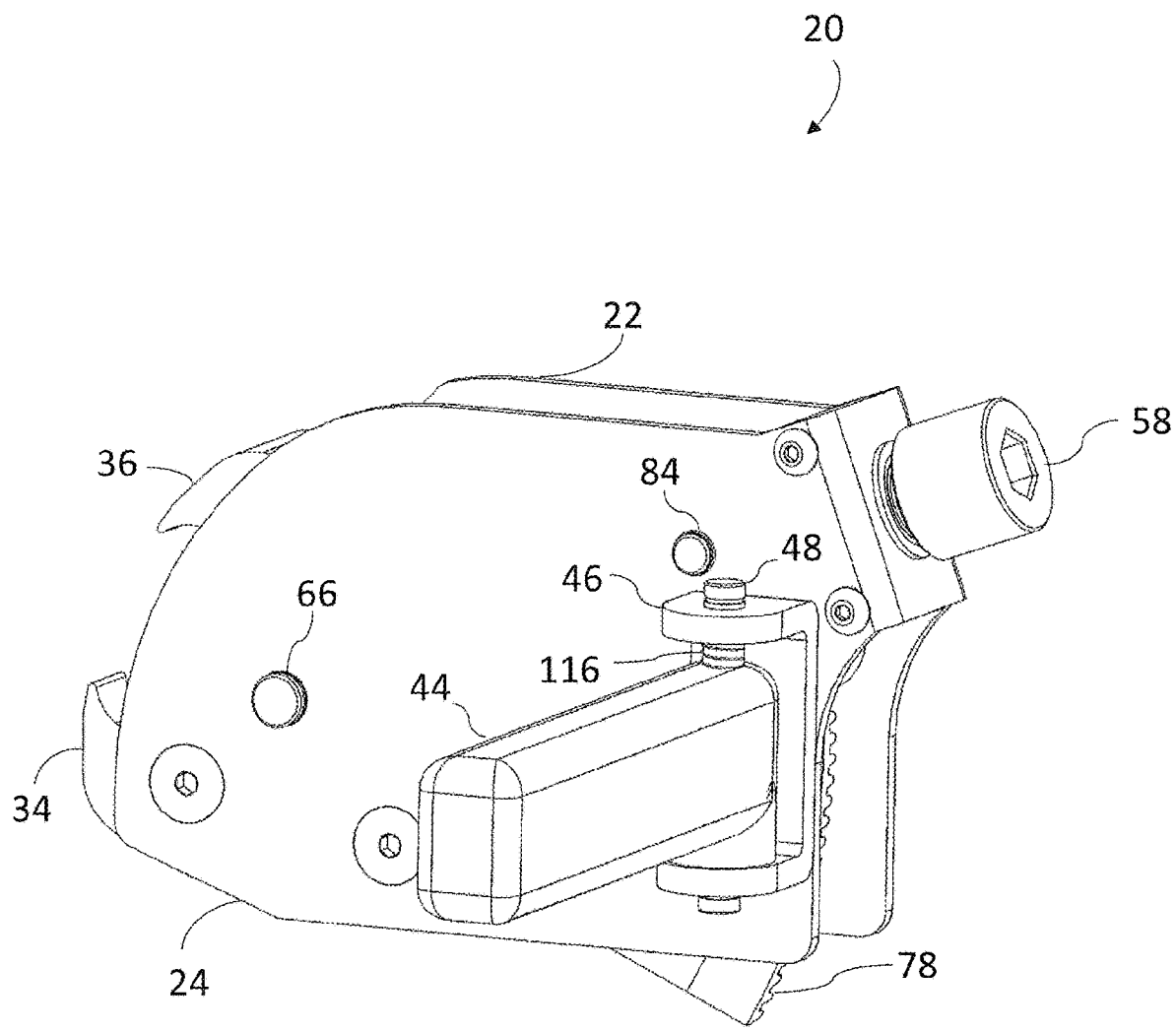
FIG. 11 is a reverse perspective view of the crimping tool of FIG. 1 with the handle in the open position.
Figure 12:
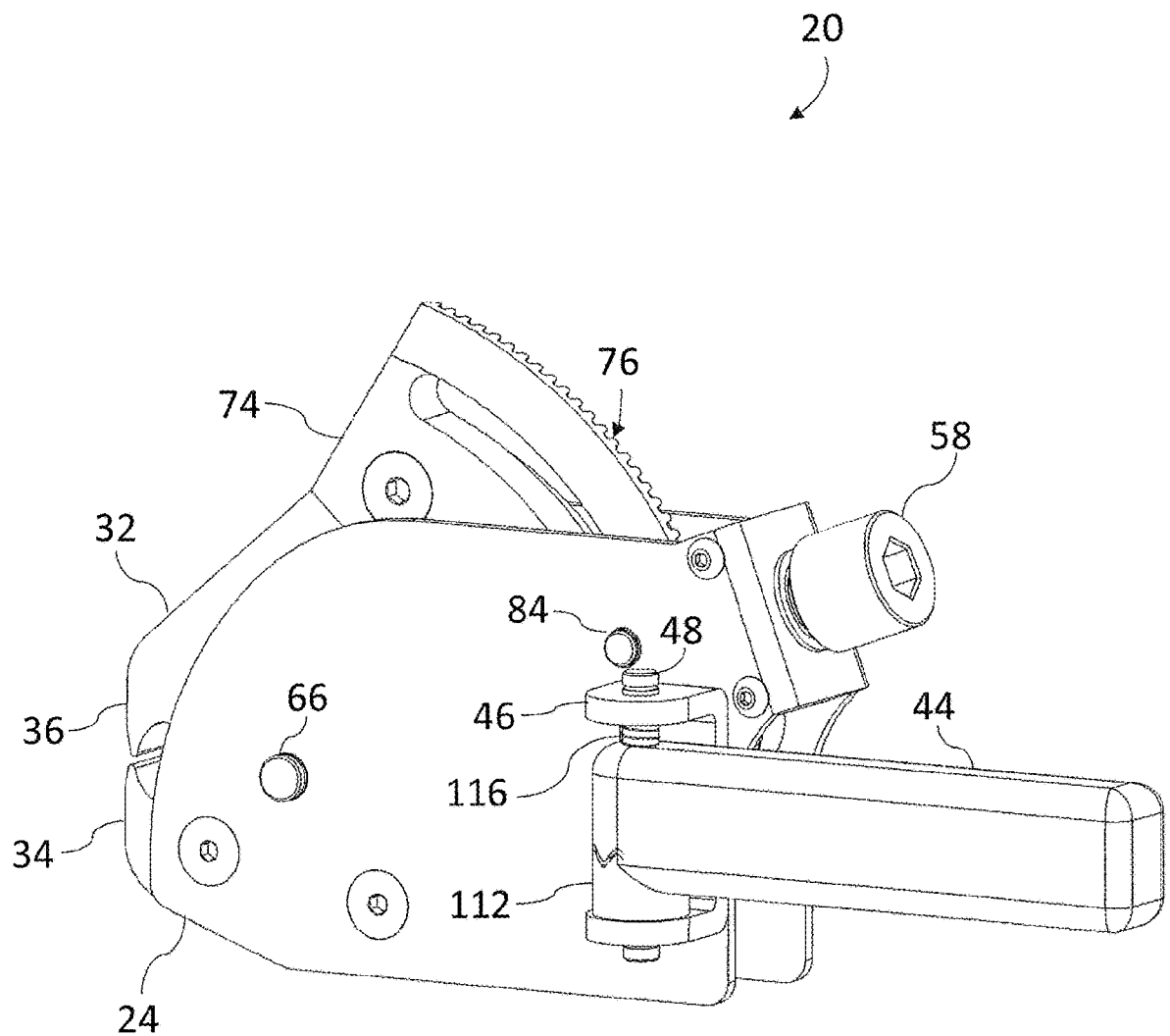
FIG. 12 is a reverse perspective view of the crimping tool of FIG. 1 with the handle in the extended position.

Referring now to FIGS. 10-12, with continuing reference to FIG. 2, an embodiment of the multi-position handle 44 is shown and described. In an embodiment, the handle 44 is an elongate member that is rotationally attached to the bracket 46 by a pin 48. The bracket 46 is fixedly coupled to the side plate 24. In an embodiment, the handle 44 has a plurality of teeth 52 arranged on one end 50. The teeth 52 are radially disposed about the pin 48 when the handle 44 is coupled to the bracket 46. In this embodiment, the bracket 46 includes a positioning member 112 coupled to an arm 114 of the bracket 46. The positioning member 112 has a plurality of teeth 54 arranged on a side opposite the arm 114. The teeth 54 cooperate with the teeth 52 to hold the handle 44 in one of a plurality of positions. In the exemplary embodiment, the teeth 52, 54 have a triangular profile. It should be appreciated that the handle 44 will remain in position when the teeth 52 are engaged with the teeth 54. To facilitate this, a biasing member, such as compression spring 116 is arranged between a surface 118 of the handle and an arm 120 of the bracket 46. The spring 116 applies a force to the surface 118 that causes the teeth 52 into engagement with the teeth 54. To move the position of the handle 44, the operator applies a counter force (moving the surface 118 towards the arm 120) until the teeth are disengaged and the handle 44 may be rotated about the pin 48.

As described above, the handle 44 may be selectively moved between a plurality positions, such as but not limited to a closed position (FIG. 2), an open position (FIG. 11) and an extended position (FIG. 12).

Figure 13:
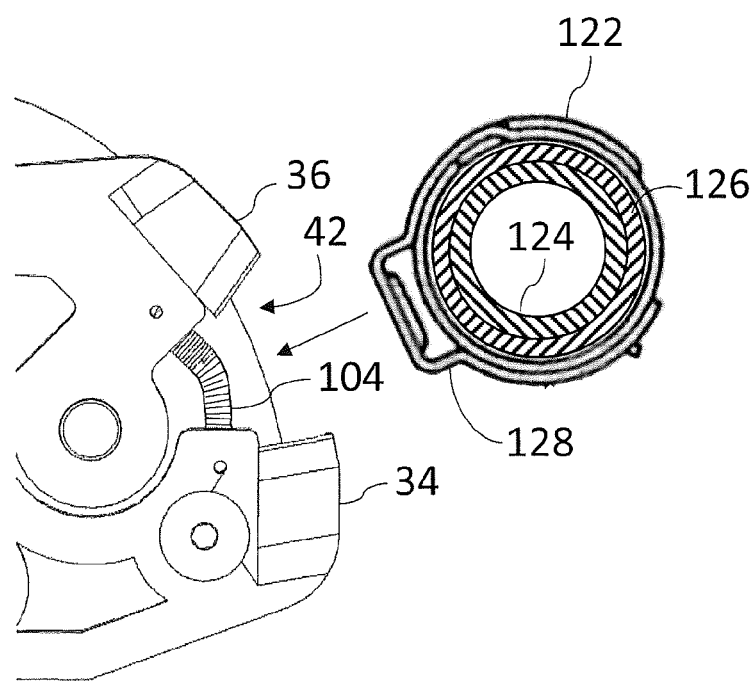
FIG. 13 is a side view of a process for crimping a band clamp using the crimping tool of FIG. 1.
Figure 14:
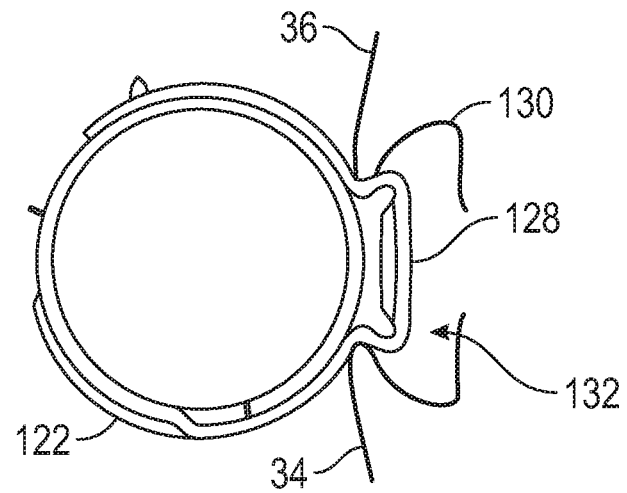
FIG. 14 is a side view of a process for crimping a band clamp using the crimping tool of FIG. 1.
Figure 15:
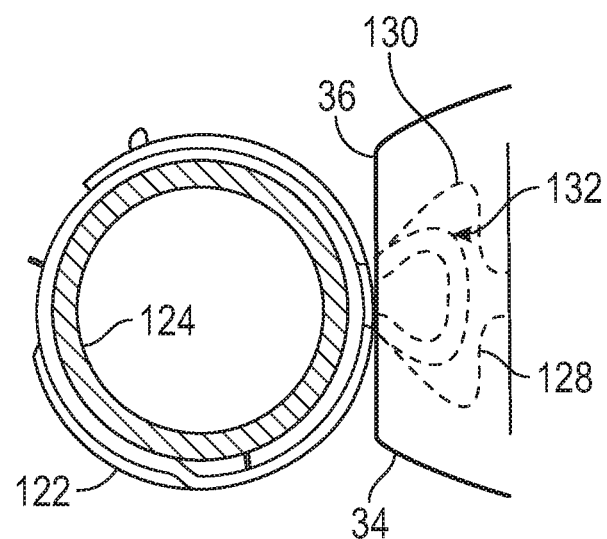
FIG. 15 is a side view of a process for crimping a band clamp using the crimping tool of FIG. 1.

Referring now to FIGS. 13-15, the operation is shown of the tool 20 to crimp a band clamp 122. The operator initially slides the band clamp 122 onto the tube 124 to be coupled and installs the end of the tube 124 over a fitting 126. The band clamp 122 has a u-shaped section, sometimes referred to as an "ear" 128. The ear 128 is inserted into the gap 42 between the movable jaw 32 and the stationary jaw 30 with the movable jaw 32 in the open position.

By actuating the first input member 55 or the second input member 58, the crimping mechanism engages the sides of the ear 128 causing the ear 18 to deform by bending inwardly (FIG. 14). As the ear 128 deforms, the band portion of the band clamp 122 is pulled towards the ear 128. This has the effect of reducing the diameter of the band clamp 122, tightening the band clamp 122 on the tube 124 and the fitting 126. As the operator continues to actuate either the first input member 55 or the second input member 58, the crimping mechanism moves the movable jaw 32 towards the stationary jaw 30 until the desired amount of crimp is achieved (FIG. 15). In an embodiment, the jaw portions 34, 36 each have a curved surface 130 that defines an area 132 that allows the ear 128 to deform as the jaw portions 34, 36 are closed.

It should be appreciated that while embodiments herein refer to the use of a tool 20 with a particular type of clamp (e.g. a ear type band clamp), this is for exemplary purposes and the claims should not be so limited. In other embodiments, the tool 20 may be used with other types of clamps. In still other embodiments, the tool 20 may be adapted to perform a cutting operation or be used in cooperation with ring clamps.

Technical effects and benefits of some embodiments include providing a tool that allows the crimping of a clamp from multiple input positions. Further technical benefits include a crimping mechanism that provides a compact crimping tool having a handle that may be moved to multiple positions to facilitate holding of the tool.

The term "about" is intended to include the degree of error associated with measurement of the particular quantity based upon the equipment available at the time of filing the application. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A crimping tool for a band clamp having an ear, the crimping tool comprising:
   a stationary jaw;
   a movable jaw adjacent the stationary jaw, the movable jaw being movable from an open position to a closed position;
   a linkage operably coupled to the movable jaw on one end, the linkage rotatable about an axle;
   a first input member operably coupled to the linkage to rotate the linkage about the axle, the first input member rotating about a first axis;
   a second input member operably coupled to the linkage to rotate the linkage about the axle, the second input member rotating about a second axis, the second axis being perpendicular to the first axis;
   a first frame and a second frame disposed on opposing sides of the linkage, the axle being coupled to the first frame and second frame; and
   a handle movably coupled to the first frame, the handle being movable between a plurality of positions, wherein the handle includes:
   a bracket coupled to the first frame,
   a handle portion rotationally coupled to the bracket, the handle having a plurality of first teeth on one end,
   a portion member having a plurality of second teeth arranged to engage the plurality of first teeth, and
   a biasing member disposed between the bracket and the handle portion to bias the plurality of first teeth into engagement with the plurality of second teeth;
   wherein the stationary jaw and the movable jaw each include a recess, the stationary jaw recess and the movable jaw recess cooperating to define an opening in a crimped position sized to define a predetermined amount of crimp in a band clamp, each of the stationary jaw and the movable jaw further having a curved surface that cooperates with the opening to define an area sized to deform the ear.

2. The crimping tool of claim 1, wherein the linkage is integral with the movable jaw.

3. The crimping tool of claim 2, further comprising an extension spring coupled to the movable jaw and the stationary jaw, the extension spring being positioned between the axle and a first jaw portion of the movable jaw and a second jaw portion of the stationary jaw.

4. The crimping tool of claim 3 wherein the opening is offset from a centerline of the movable jaw and stationary jaw.

5. The crimping tool of claim 2, further comprising of compression spring coupled between the stationary jaw and the linkage and arranged to bias the movable jaw into a crimped position.

6. A crimping tool comprising:
a stationary jaw;
a movable jaw adjacent the stationary jaw, the movable jaw being movable from an open position to a closed position;
a linkage operably coupled to the movable jaw on one end, the linkage rotatable about an axle, wherein the linkage is integral with the movable jaw;
a first input member operably coupled to the linkage to rotate the linkage about the axle, the first input member rotating about a first axis; and
a second input member operably coupled to the linkage to rotate the linkage about the axle, the second input member rotating about a second axis, the second axis being perpendicular to the first axis; and
wherein the linkage first comprises a first plurality of gear teeth arranged to engage with the first input member and a second plurality of gear teeth arranged to engage with the second input member.

7. The crimping tool of claim 6, further comprising a transfer gear coupled between the first input member and the first plurality of gear teeth.

\* \* \* \* \*